June 20, 1950 M. J. PIFER 2,512,258

DECIMAL PUSH-BUTTON TUNING SYSTEM

Filed Sept. 13, 1945 2 Sheets-Sheet 1

INVENTOR
Marion J. Pifer
BY C. A. Norton
ATTORNEY

June 20, 1950 M. J. PIFER 2,512,258

DECIMAL PUSH-BUTTON TUNING SYSTEM

Filed Sept. 13, 1945 2 Sheets-Sheet 2

INVENTOR
Marion J. Pifer
BY C. A. Norton
ATTORNEY

Patented June 20, 1950

2,512,258

UNITED STATES PATENT OFFICE 2,512,258

DECIMAL PUSH-BUTTON TUNING SYSTEM

Marion J. Pifer, Williamsville, N. Y., assignor to Colonial Radio Corporation, Buffalo, N. Y.

Application September 13, 1945, Serial No. 616,008

6 Claims. (Cl. 171—242)

Figure 1:
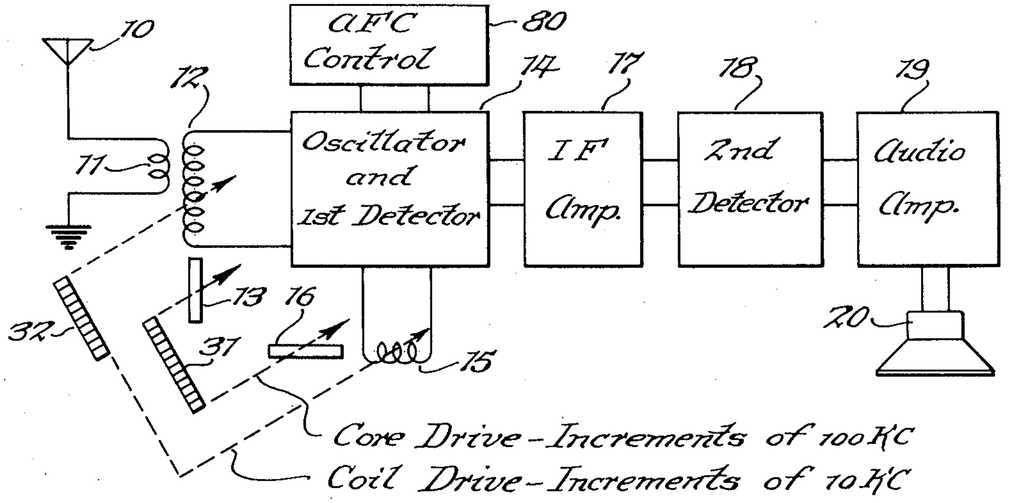

This invention relates to a push button tuning system particularly designed and adapted for radio receivers, although, as will be understood, it may be applied to electrical apparatus other than radio receivers tunable over a range of frequencies. In most push button tuning systems heretofore proposed, a single button is allocated to a single station or frequency channel, and such station or channel is selected by the pushing of a single button.

It is apparent that this system is limited in the number of push buttons which can be practically provided in the receiver, and eight is usually the largest number employed in sets heretofore available on the market. In many cases only five or six buttons are provided, thus limiting the push button operation to that number of stations. For any other station manual tuning must be resorted to, which means that the receiver must be equipped with a manual tuning control and an indicator, in addition to the push button control.

It has been suggested to provide a series of push buttons which operate according to the decimal system in part; that is a first bank of buttons would be provided, differing in increments of 100 kc. and starting with 500 kc. and extending up to 1600 kc. In addition, a second bank of push buttons would be provided differing in increments of 10 kc., starting at 0 and continuing up to and including 9. If the operator wished to select a station operating on a frequency of 590, for example, he would push the 5 button in the first bank and the 9 button in the second bank.

However, such apparatus, as far as I know, has serious defects, because it requires a dual oscillator and capacity circuit switching. This means that the selectivity in the radio frequency circuits is poor, the rejection of undesired signals is very bad, and a great many squeals are encountered because of the many harmonics and spurious frequencies generated by the dual oscillator.

In accordance with my invention, I provide a decimal push button tuning system which eliminates the difficulties and faults heretofore inherent in such apparatus, makes possible the use of highly selective tuning circuits heretofore employed, and eliminates the necessity for a dual oscillator, thereby greatly reducing the squeals and other undesired noises heretofore produced by such systems.

It is an object of this invention to provide a decimal push button tuning system which eliminates the drawbacks and objectionable features of the heretofore known apparatus.

It is a further object of this invention to provide such a system which may employ permeability tuned circuits, the electrical features of which afford high selectivity and high rejection of undesired signals.

It is a further object of this invention to provide such a system which eliminates the capacity switching and dual oscillators heretofore characteristic of such systems with their attendant troubles.

It is still a further object of this invention to provide a generally improved decimal push button tuning system which may be employed in tuned radio frequency type receivers as well as superheterodyne type receivers.

Still other objects and advantages of my invention will be apparent from the specification.

Figure 2:
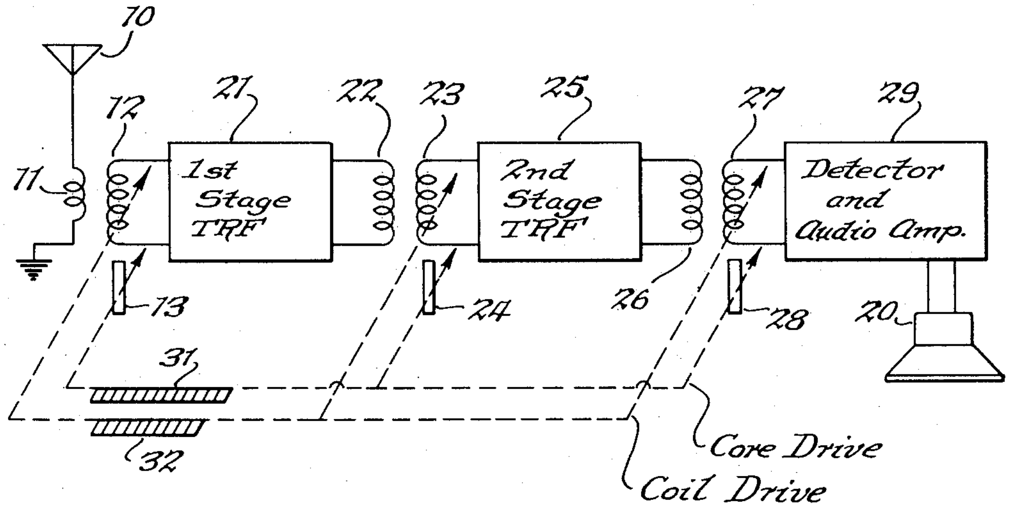
Figure 3:
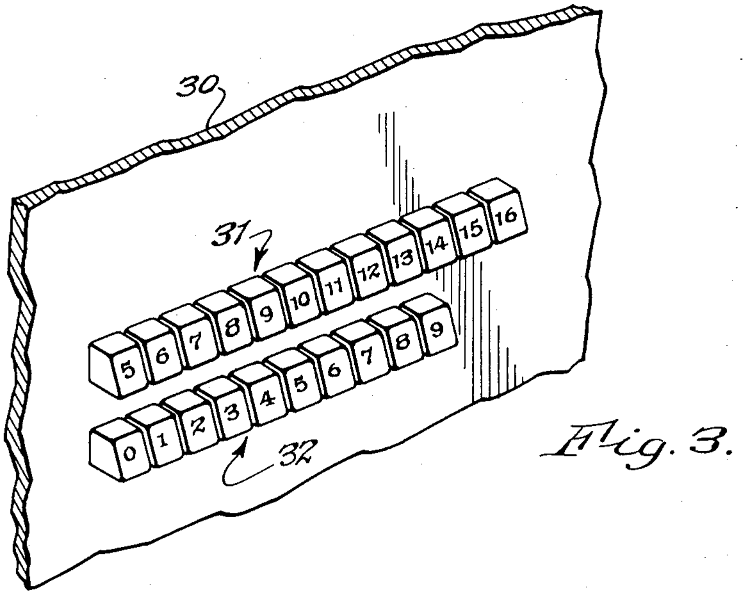
Figure 4:
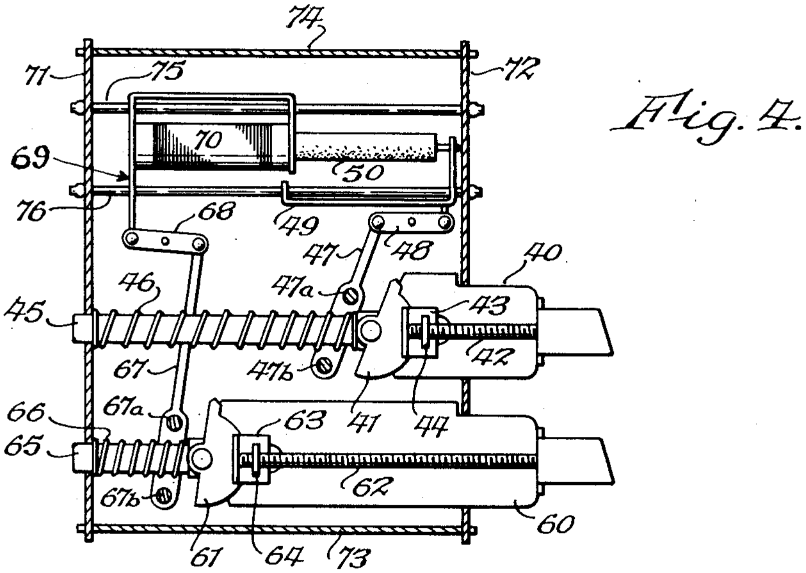

The features of novelty which I believe to be characteristic of my invention are set forth with particularity in the appended claims. My invention itself, however, both as to its fundamental principles and as to its particular embodiments, will best be understood by reference to the specification and accompanying drawing, in which:

Fig. 1 is a block diagram of a superheterodyne receiver in accordance with my invention, Fig. 2 is a similar diagram of a T. R. F. receiver in accordance with my invention, Fig. 3 is a perspective view of a portion of the front panel of a receiver according to my invention, showing the decimal push buttons, and Fig. 4 is a sectional view showing one pair of push buttons, one in the 100 kc. increment bank and one in the 10 kc. increment bank, together with the mechanism by which the variation of tuning is effected.

In accordance with the preferred form of my invention, I employ permeability tuning; that is to say, a coil which is tuned by the movement into and out of it of a core of paramagnetic material, usually in the form of finely divided iron molded with a plastic binder, but copper or silver slugs may also be employed.

In such apparatus heretofore only the core has been moved, the coils remaining fixed, but in accordance with my invention one bank of push buttons effects the movement of the core while the other bank effects the movement of the coil. Preferably the core is moved by the push buttons of the 100 kc. increment bank while the coil is moved by push buttons of the 10 kc. increment bank.

Depression of any push button in the 100 kc. increment bank moves the core to such a position that depression of the desired push button in the 10 kc. increment bank will move the coil with respect to the core so that the tuning is exact. It makes no difference which push button is pushed first, because, regardless of the order, the final position of both the coil and the core will always be the same for any combination of 100 kc. and 10 kc. increment buttons. For best operating conditions the tuning should be what is known as "straight line frequency," so that, for example, pushing of the number 1 button of the 10 kc. increment bank will always set the frequency at —10 kc., regardless of the position of the core as determined by the buttons of the 100 kc. increment bank.

Referring now more particularly to Fig. 1, this shows the manner of application of my invention to a superheterodyne receiver of otherwise conventional construction. 10 represents the antenna, which may be connected through inductance 11 to ground. Coupled to inductance 11 there may be provided inductance 12, tuned by a core of magnetic material 13, this constituting the first tuned circuit, connected to the oscillator and first detector 14.

The oscillator circuit may comprise inductance 15, likewise permeability tuned by core 16 of paramagnetic material. Both cores 13 and 16 may be ganged together. The output of oscillator and first detector 14 passes through intermediate frequency amplifier 17, then to second detector 18, and thence through the audio amplifier 19 to loud speaker 20.

Inductances 12 and 15, instead of being rigidly mounted in their circuits as was heretofore customary, are mounted for sliding movement, and the controls which effect this movement are ganged together. Inductances 12 and 15 are moved axially by the push buttons 32 of the 10 kc. increment bank, while cores 13 and 16 are moved axially by the push buttons 31 of the 100 kc. increment bank. It will be understood that if desired this construction may be reversed, but I prefer to operate as stated.

The invention may be equally well applied to receivers of the tuned radio frequency type, as indicated in Fig. 2, in which there is shown a tuned radio frequency radio receiver of otherwise conventional construction. In this case, as before, 10 may represent the antenna, connected to ground through inductance 11, which in turn is coupled to inductance 12 tuned by core 13.

Inductance 12 is connected to the input of first T. R. F. stage 21, the output supplied through inductance 22 to inductance 23, which may be tuned by second core 24. Inductance 23 feeds the second stage of the T. R. F. amplifier, the output of which is supplied through inductance 26 to inductance 27 similarly tuned by core 28. Inductance 27 is connected to a detector and audio amplifier indicated as 29, the output of which connects to loud speaker 20.

As in Fig. 1, I prefer to gang cores 13, 24, and 28 together for actuation by the buttons of the 100 kc. increment bank, and inductances 12, 23, and 27 together for operation by the buttons of the 10 kc. increment bank. The front panel of a receiver as herein described may be such as indicated in Fig. 3, in which 30 is a portion of the front panel and 31 represents the top bank of buttons, each button being marked, for instance, with the figure representing hundreds of kilocycles, and 32 the buttons of the other bank numbered in tens of kilocycles.

For a broadcast receiver, since the number of hundreds of kilocycles required may extend from 5 to 16, there will preferably be buttons in the top bank numbered from 5 to 16. The bottom bank, however, will contain buttons numbered from 0 to 9, so that it is possible to tune in any broadcast channel by pushing one button of the top bank and one button of the bottom bank.

Since this will tune any station capable of being tuned manually by the conventional manual knob, and since with latch-in buttons, the buttons themselves indicate the frequency tuned in, the entire manual drive and dial heretofore employed is no longer necessary and may be eliminated.

One form of mechanism which may be employed with this type of tuning is shown in Fig. 4. Each button of the upper bank, or 100 kc. increment bank, may operate its slider 40 carrying at its inner end adjustable cam 41. The cam may be locked in position by means of bolt 42, engaging clamping plate 43 lying between plunger 40 and bolt 42, and held on ear 44, preferably stamped from plunger 40 and having a screw threaded opening engaged by bolt 42. The construction of plunger, cam, locking plate, and screw is well known in the art in the so-called rocker and tilt bar mechanism.

Cam 41 engages rocker arm 47, having two contact bars 47a and 47b and pivoted centrally, and tilts the same to an angle determined by the adjustment of cam 41. This motion is transmitted through link 48 and bracket 49 to core 50, mounted on its frame for sliding axial movement. Plunger 40 may have extension 45 passing through a slot in rear frame plate 71, and may be surrounded by spring 46, which urges it to forward position.

Each of cams 41, corresponding to each of the buttons of the 100 kc. increment group, may be previously adjusted and locked at the factory, and, unlike the conventional push button tuned receiver, will not require resetting by the user when the set is moved to a different locality as is now the case with conventional push button receivers.

A similar construction may be employed for buttons 32 of the 10 kc. increment group, each operating slider or plunger 60 carrying adjustable cam 61 locked by bolt 62 and engaging clamping plate 63 carried on ear 64. Plunger extension 65 may extend through back plate 71 as before, and tilt bar 67 may be provided, having contact bars 67a and 67b to be engaged by cam 61. The motion of tilt bar 67 may be transmitted through link 68, and bracket 69 to coil 70, slidable on rod 75, whereas the cores are slidable on rod 76. Front frame plate 72 may be provided, as well as top and bottom frame plates 74 and 73.

It will be understood that while Fig. 4 shows only one coil and core, actually as many cores and coils may be mounted on their respective brackets as may be desired.

The construction heretofore described is sufficient to perform as desired, but will require for best results the same order of accuracy in setting up adjustable cams 41 and 61 heretofore necessary in push button tuners. The accuracy necessary in these settings may be considerably reduced by the application to the oscillator in Fig. 1 of a suitable form of automatic frequency control circuit indicated as 80, well known to those skilled in the art, and not here necessary to be further described.

The provision of such frequency control not only reduces the accuracy necessary in the construction and adjustment of the receiver, but also serves to correct for thermal drift which might render the tuning inaccurate even in the most precisely adjusted receiver.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In push button tuning apparatus, in combination, a frame, a tunable circuit including an inductance mounted on said frame and movable as a whole with respect thereto, a core mounted on said frame and movable with respect to said inductance to vary the value thereof, a plurality of operating members movable to change the position of said core on said frame, said members changing the frequency of said circuit in predetermined uniform frequency increments, and a second plurality of operating members movable to change the position of said inductance on said frame, said second operating members changing the frequency of said circuit in predetermined increments, the frequency increments of one of said operating members being ten times those of the other.

2. In push button tuning apparatus, in combination, a frame, a tunable circuit including an inductance mounted on said frame and movable as a whole with respect thereto, a core mounted on said frame and movable with respect to said inductance to vary the value thereof, a plurality of operating members movable to change the position of said core on said frame, said operating members changing the tuning frequency in predetermined equal increments, and a second plurality of operating members movable to change the position of said inductance on said frame, said second plurality of operating members operating to change the tuning frequency by equal increments one-tenth those of the increments of the first plurality.

3. In radio receiving apparatus, in combination, a frame, a circuit tunable to receive incoming signals, including an inductance mounted on said frame and movable as a whole with respect thereto, a core mounted on said frame and movable with respect to said inductance to vary the value thereof, a plurality of operating members including rocker arms and a tilt bar movable to change the position of said core on said frame, and a second plurality of operating members including rocker arms and a tilt bar movable to change the position of said inductance on said frame, the operating members of each plurality changing the tuned frequency in predetermined increments, and the increments of one plurality being ten times those of the other.

4. In radio receiving apparatus, in combination, a frame, a circuit tunable to receive incoming signals, including an inductance mounted on said frame and movable as a whole with respect thereto, a core mounted on said frame and movable with respect to said inductance to vary the value thereof, a plurality of operating members including rocker arms and a tilt bar movable to change the position of said core on said frame, said operating members changing the tuning frequency by predetermined equal increments, and a second plurality of operating members including rocker arms and a tilt bar movable to change the position of said inductance on said frame, said second members operating to change the tuning frequency by predetermined equal increments one-tenth those of the first plurality.

5. In push button tuning apparatus, in combination, a frame, a tunable circuit including an inductance mounted on said frame, and movable as a whole with respect thereto, a core mounted on said frame and movable with respect to said inductance to vary the value thereof, a plurality of operating members movable to change the position of said core on said frame, said members changing the frequency of said circuit in predetermined frequency increments, and a second plurality of operating members movable to change the position of said inductance on said frame, said second operating members changing the frequency of said circuit in predetermined increments, the frequency increments of one of said operating members being a fixed multiple of those of the other.

6. In radio receiving apparatus, in combination, a frame, a circuit tunable to receive incoming signals, including an inductance mounted on said frame and movable as a whole with respect thereto, a core mounted on said frame and movable to said inductance to vary the value thereof, a plurality of operating members including rocker arms and a tilt bar movable to change the position of said cores on said frame, said operating members changing the tuning frequency by predetermined equal increments, and a second plurality of operating members including rocker arms and a tilt bar movable to change the position of said inductance, said second members operating to change the tuning frequency by predetermined equal increments which are fractional multiples of those of the first plurality.

MARION J. PIFER.

REFERENCES CITED

The following references are of record in the file of this patent:

UNITED STATES PATENTS

| Number | Name | Date |
|---|---|---|
| 2,154,778 | Schnell | Apr. 18, 1939 |
| 2,175,554 | Bliss | Oct. 10, 1939 |
| 2,226,822 | Kirk | Dec. 31, 1940 |
| 2,255,680 | Sands et al. | Sept. 9, 1941 |
| 2,285,128 | Rosenberg | June 2, 1942 |
| 2,319,472 | Plensler | May 18, 1943 |
| 2,338,134 | Sands et al. | Jan. 4, 1944 |
| 2,354,148 | Shaw | July 18, 1944 |